United States Patent
Thompson

(10) Patent No.: US 6,719,053 B2
(45) Date of Patent: Apr. 13, 2004

(54) ESTER/MONOESTER COPOLYMER COMPOSITIONS AND METHODS OF PREPARING AND USING SAME

(75) Inventor: Joseph E. Thompson, Houston, TX (US)

(73) Assignee: BJ Services Company, Houston, TX (US)

( * ) Notice: Subject to any disclaimer, the term of this patent is extended or adjusted under 35 U.S.C. 154(b) by 178 days.

(21) Appl. No.: 10/134,745

(22) Filed: Apr. 29, 2002

(65) Prior Publication Data

US 2003/0045605 A1 Mar. 6, 2003

Related U.S. Application Data

(60) Provisional application No. 60/287,464, filed on Apr. 30, 2001.

(51) Int. Cl.$^7$ .................................................. E21B 43/22
(52) U.S. Cl. ..................... 166/305.1; 166/279; 166/300
(58) Field of Search .............................. 166/305.1, 300, 166/308, 281, 294, 295, 278, 279, 310

(56) References Cited

U.S. PATENT DOCUMENTS

| | | | |
|---|---|---|---|
| 3,163,219 A | 12/1964 | Wyant et al. .................. 166/42 |
| 3,264,272 A | 8/1966 | Rees .......................... 260/78.5 |
| 3,342,787 A | 9/1967 | Muskat ....................... 260/78.5 |
| 3,505,374 A | 4/1970 | Monroe ....................... 260/439 |
| 3,511,820 A | 5/1970 | Verdol et al. ............... 260/78.5 |
| 3,528,939 A | 9/1970 | Pratt et al. ................. 260/29.6 |
| 3,536,461 A | 10/1970 | Mueller et al. ................. 44/62 |
| 3,650,970 A | 3/1972 | Pratt et al. ................... 252/181 |
| 3,654,990 A | 4/1972 | Harnsberger et al. ....... 166/281 |
| 3,654,991 A | 4/1972 | Harnsberger et al. ....... 166/281 |
| 3,654,992 A | 4/1972 | Harnsberger et al. ....... 166/281 |
| 3,657,123 A | 4/1972 | Stram ........................ 252/34.7 |
| 3,741,943 A | 6/1973 | Sekmakas .................. 260/78.5 |
| 3,757,864 A | 9/1973 | Crawford et al. ............ 166/308 |
| 3,825,430 A | 7/1974 | Kurka ........................... 96/115 |
| RE28,475 E | 7/1975 | Blecke et al. .............. 260/78.5 |
| 4,003,393 A | 1/1977 | Jaggardet ..................... 137/15 |
| 4,100,231 A | 7/1978 | Tai et al. ..................... 260/978 |
| 4,153,649 A | 5/1979 | Griffin, Jr. .................. 260/950 |
| 4,158,595 A | 6/1979 | Rave .......................... 162/157 |
| 4,174,283 A | 11/1979 | Griffin, Jr. ................. 252/8.55 |
| 4,186,802 A | 2/1980 | Perlman ...................... 166/280 |
| 4,200,540 A | 4/1980 | Burnham .................... 252/8.55 |
| 4,252,466 A | 2/1981 | Berti et al. .................. 405/172 |
| 4,282,414 A | 8/1981 | Johnston et al. ............... 44/62 |
| 4,301,868 A | 11/1981 | Scherubel et al. .......... 166/308 |
| 4,316,810 A | 2/1982 | Burnham .................... 262/8.55 |
| 4,361,669 A | 11/1982 | Evans et al. ................. 524/424 |
| 4,391,721 A | 7/1983 | Pappas ....................... 252/51.5 |
| 4,401,793 A | 8/1983 | Chiao et al. ................. 525/285 |
| 4,404,112 A | 9/1983 | Scherubel et al. .......... 252/8.55 |
| 4,416,703 A | 11/1983 | Scott ............................. 134/8 |
| 4,420,599 A | 12/1983 | Seki et al. ................... 526/318 |
| 4,442,232 A | 4/1984 | Kajimura et al. ............. 521/56 |
| 4,450,261 A | 5/1984 | Chiao et al. ................. 526/214 |
| 4,506,734 A | 3/1985 | Nolte .......................... 166/308 |
| 4,543,131 A | 9/1985 | Purinton, Jr. ................... 134/8 |
| 4,615,393 A | 10/1986 | Sedillo et al. .............. 166/308 |
| 4,622,155 A | 11/1986 | Harris et al. ............. 252/8.551 |
| 4,635,721 A | 1/1987 | Sheffield et al. ............ 166/268 |
| 4,665,982 A | 5/1987 | Brown ........................ 166/250 |
| 4,722,947 A | 2/1988 | Thanawalla et al. ........ 522/120 |
| 4,741,401 A | 5/1988 | Walles et al. ................ 166/300 |
| 4,780,221 A | 10/1988 | Holtmyer et al. ......... 252/8.551 |
| 4,877,894 A | 10/1989 | Huddleston ................. 558/113 |
| 5,057,233 A | 10/1991 | Huddleston .............. 252/8.551 |
| 5,076,852 A | 12/1991 | Bloys et al. ................. 106/725 |
| 5,082,059 A | 1/1992 | Engelhardt et al. ......... 166/308 |
| 5,110,486 A | 5/1992 | Manalastas et al. ..... 252/8.551 |
| 5,132,271 A | 7/1992 | Seitz .......................... 503/213 |
| 5,140,070 A | 8/1992 | MacLeay et al. ........... 525/169 |
| 5,145,590 A | 9/1992 | Dawson ................... 252/8.551 |
| 5,197,324 A | 3/1993 | Keys ............................ 73/40.5 |
| 5,271,464 A | 12/1993 | McCabe ..................... 166/295 |
| 5,310,721 A | 5/1994 | Lo .............................. 504/116 |
| 5,330,588 A | 7/1994 | Gulley ........................ 148/271 |
| 5,374,184 A | * 12/1994 | Platzer et al. ............... 430/262 |
| 5,381,864 A | 1/1995 | Nguyen et al. ............. 166/280 |

(List continued on next page.)

FOREIGN PATENT DOCUMENTS

| | | |
|---|---|---|
| DE | 1800712 | 5/1969 |
| EP | 86305124.9 | 1/1986 |
| EP | 87310946.6 | 11/1987 |
| EP | 88305437.1 | 6/1988 |
| EP | 89303738.2 | 4/1989 |
| JP | 8484933 | 5/1984 |
| SU | 1482171 | 11/1995 |

OTHER PUBLICATIONS

American Chemistry Society Symp. Ser., 1983, vol. 229, Iss. *Eff. Hostile Environ.Coat. Plast.* pp. 49–54.

Primary Examiner—Zakiya Walker
(74) Attorney, Agent, or Firm—Howrey Simon Arnold & White LLP

(57) ABSTRACT

Compositions comprising a base fluid and a monoester copolymer of styrene and maleic anhydride are disclosed. The compositions can further comprise an alkyl orthophosphate ester. The base fluid can be an aqueous or organic base fluid. The monoester copolymer is at least partially soluble or dispersible in the base fluid. Preferably, the composition may further include a cross-linking agent capable of increasing the viscosity of the composition, such as aluminum isopropoxide or other metal source compounds. The composition can form a gel which is stable at a temperature of about 250° F. (121° C.) or higher. Some gels of the present invention exhibit stability up to about 300° F. (149° C.) to 350° F. (177° C.) or higher. The compositions have many applications, such as pipeline treatment, conformance, hydraulic fracturing, well completion, gravel packing, drilling fluids, process facility treatment fluids, and other well treatment applications.

7 Claims, 5 Drawing Sheets

U.S. PATENT DOCUMENTS

| | | | |
|---|---|---|---|
| 5,382,411 A | 1/1995 | Allen | 422/131 |
| 5,411,091 A | 5/1995 | Jennings, Jr. | 166/280 |
| 5,417,287 A | 5/1995 | Smith et al. | 166/308 |
| 5,419,183 A | 5/1995 | Keys | 73/49.5 |
| 5,492,137 A | 2/1996 | Giblin et al. | 134/60 |
| 5,497,830 A | 3/1996 | Boles et al. | 166/300 |
| 5,514,645 A | 5/1996 | McCabe et al. | 507/238 |
| 5,519,063 A | 5/1996 | Mondet et al. | 514/772.4 |
| 5,552,377 A | 9/1996 | Kindred | 507/209 |
| 5,609,207 A | 3/1997 | Dewprashad et al. | 166/276 |
| 5,614,010 A | 3/1997 | Smith et al. | 106/285 |
| 5,641,890 A | 6/1997 | Wesley et al. | 44/266 |
| 5,773,518 A | 6/1998 | Keil et al. | 525/327.7 |
| 5,834,088 A | 11/1998 | Pechhold | 428/96 |
| 5,846,915 A | 12/1998 | Smith et al. | 507/269 |
| 5,948,735 A | 9/1999 | Newlove et al. | 507/238 |
| 5,948,843 A | 9/1999 | Boutier et al. | 524/313 |
| 5,972,558 A * | 10/1999 | Benzing et al. | 430/257 |
| 5,998,545 A | 12/1999 | Melot et al. | 525/178 |
| 6,054,417 A | 4/2000 | Graham et al. | 507/238 |
| 6,149,693 A | 11/2000 | Geib | 44/270 |
| 6,302,209 B1 | 10/2001 | Thompson, Sr. et al. | 166/305.1 |
| 6,342,468 B1 | 1/2002 | Geib | 507/238 |
| 6,573,316 B1 * | 6/2003 | Albrecht et al. | 524/96 |

\* cited by examiner

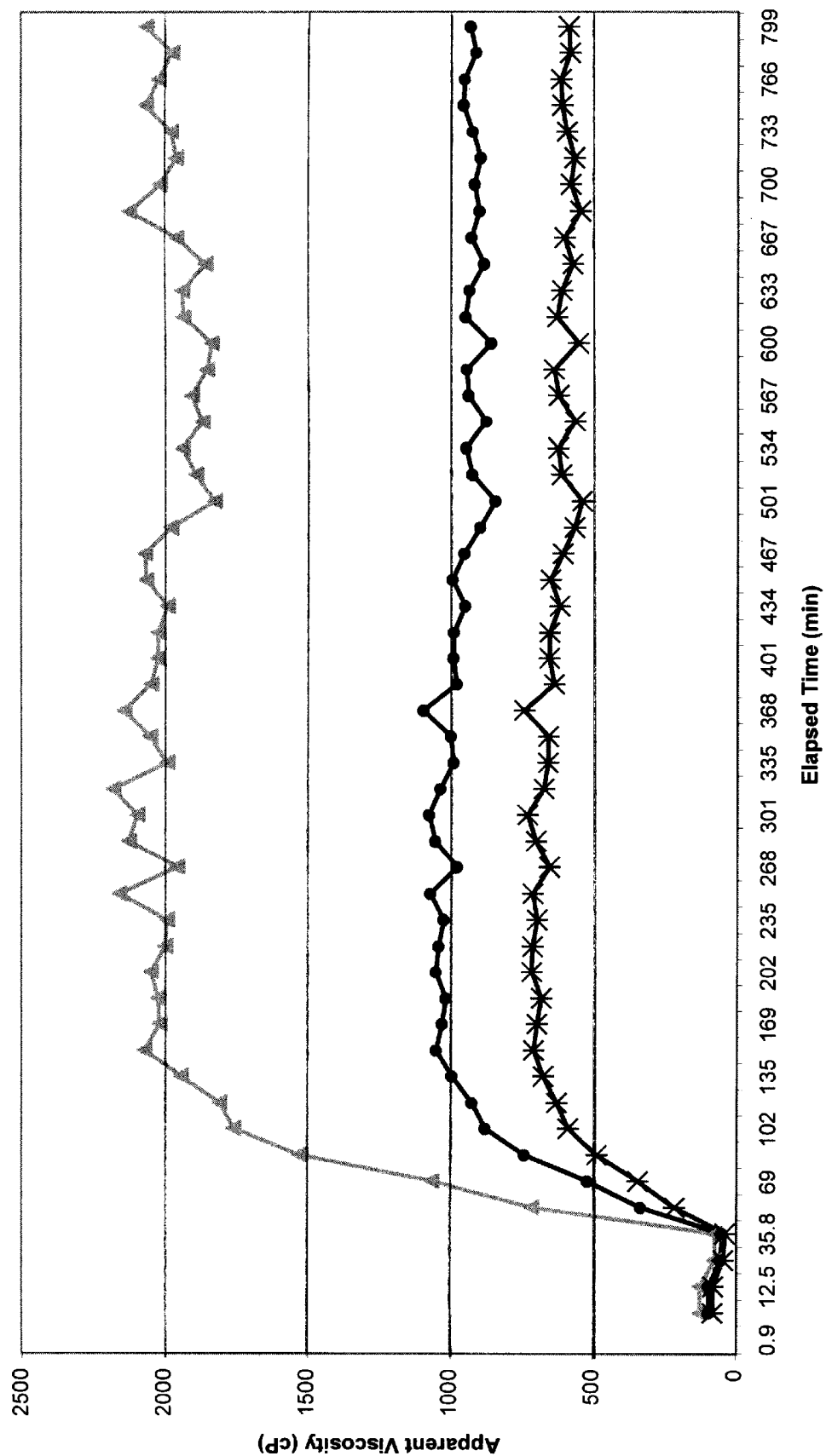

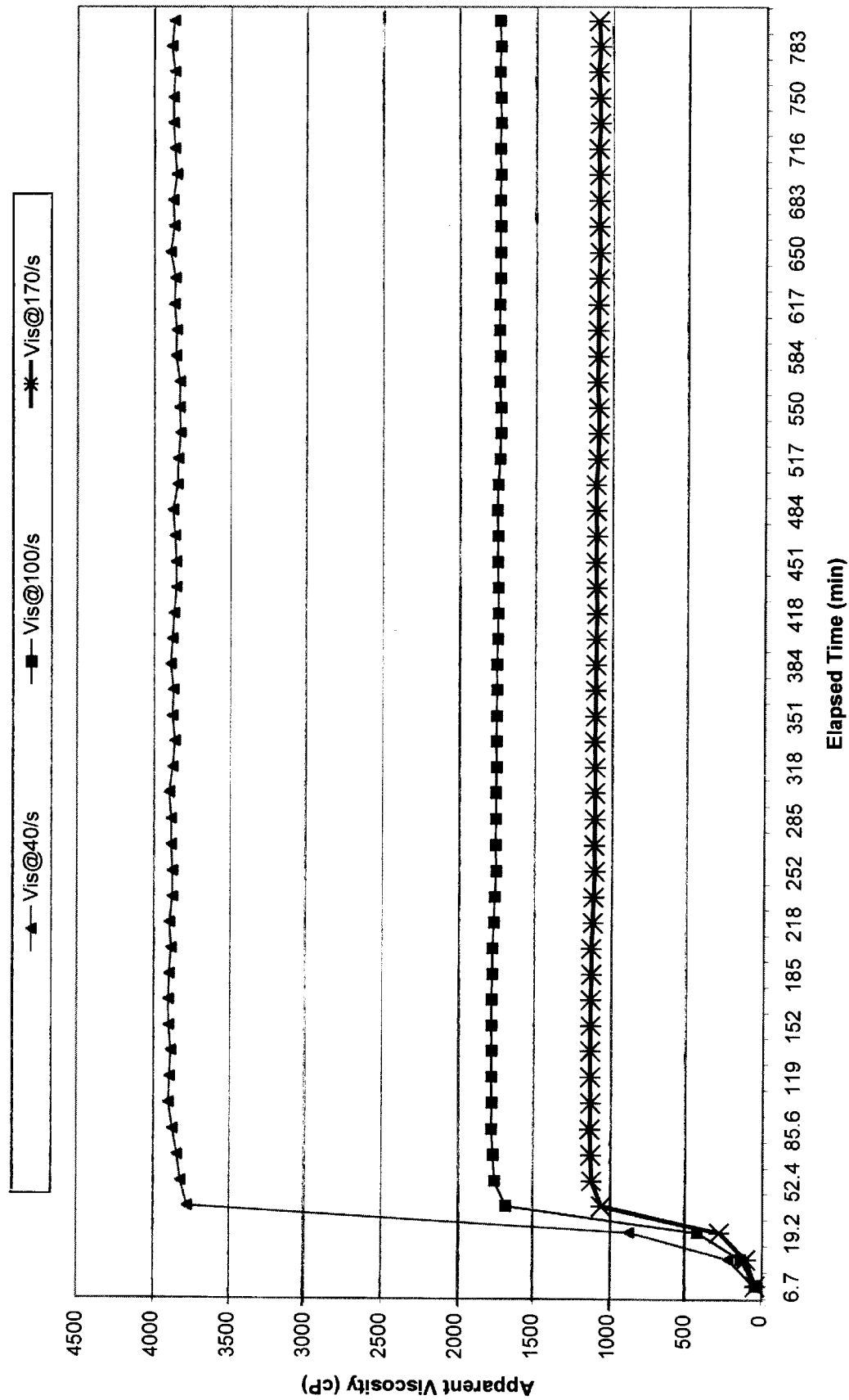

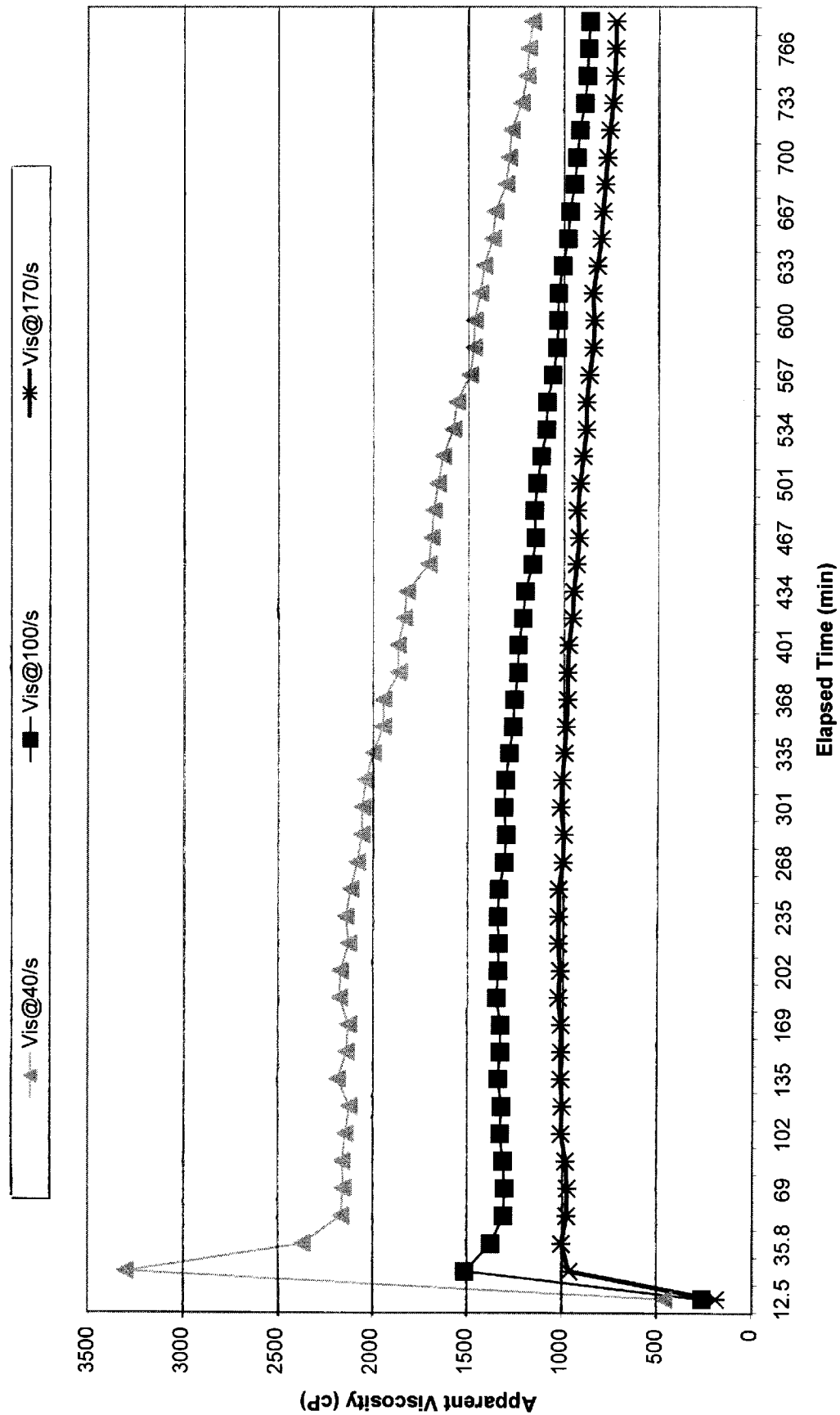

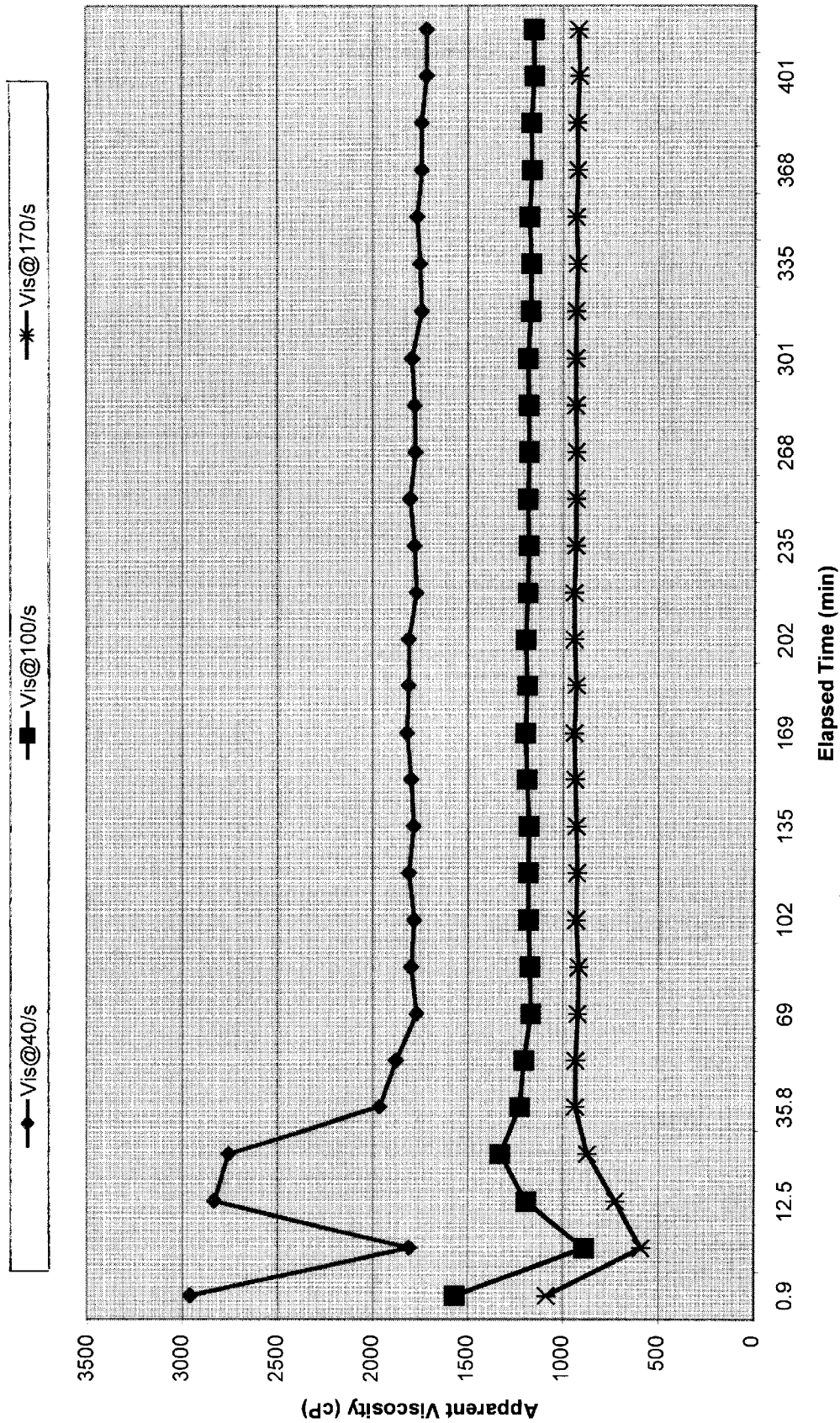

ESTER/MONOESTER COPOLYMER COMPOSITIONS AND METHODS OF PREPARING AND USING SAME

CROSS-REFERENCE TO RELATED APPLICATIONS

This application claims benefit of U.S. Provisional Patent Application Ser. No. 60/287,464, filed Apr. 30, 2001.

FIELD OF THE INVENTION

The invention relates to compositions and methods for treating subterranean formations. More particularly, it relates to compositions and methods for treating a subterranean formation penetrated by a well bore into which a gel with a high viscosity is injected.

BACKGROUND OF THE INVENTION

Viscous well treatment fluids are commonly utilized in the drilling, completion, and treatment of subterranean formations penetrated by well bores. A viscous well treatment fluid is generally composed of a polysaccharide or synthetic polymer in an aqueous or non-aqueous solution, which is cross-linked by an organometallic compound or a metal source compound. Examples of well treatments in which metal-crosslinked polymers are used include hydraulic fracturing, gravel packing operations, water blocking, and others.

Hydraulic fracturing techniques are widely employed to enhance oil and gas production from subterranean formations. During hydraulic fracturing, a proppant-laden fluid is injected into a well bore under pressure. Once the natural reservoir pressures are exceeded, the fracturing fluid initiates a fracture in the formation that generally continues to grow during pumping. The treatment design generally requires the fluid to reach a maximum viscosity as it enters the fracture which affects the fracture length and width. Adding cross-linking agents can further increase the viscosity of the fracturing fluid. The gelled fluid may be accompanied by a propping agent (i.e., proppant) which results in placement of the proppant within the fracture thus produced. The proppant remains in the produced fracture to prevent the complete closure of the fracture and to form a conductive channel extending from the well bore into the formation being treated once the fracturing fluid is recovered.

Gelled hydrocarbons have been used in petroleum producing subterranean formations as fracturing fluids to improve the recovery of oil and natural gas. The fracturing fluids are hydraulically injected into a well bore which penetrates the subterranean formation and are propelled against the formation strata by high pressure, forcing the strata to crack and fracture. Fracturing fluids can be thickened or gelled through the use of various chemical agents which act to increase viscosity or induce the gel formation. The viscosity of liquid hydrocarbon fracturing fluids can be increased by a variety of thickening agents, such as fatty esters and aluminum complexed fatty acids.

A situation is frequently encountered in well treatments where the bottom hole temperature or the environmental temperature at the locus of the fracture exceeds about 200° F. (93° C.). At such elevated temperatures, many types of fluids introduced into the formation to fracture the formation can undergo a reduction in viscosity, thereby losing their fracturing capability. For example, significant decreases in viscosity at temperatures exceeding 200° F. (93° C.) have been observed in the case of fracturing fluids prepared from hydratable polysaccharides or hydratable polyacrylamides. If an attempt is made to increase the viscosity of an oil-based fracturing fluid as it is made up and prior to pumping it into the subterranean location, the increased viscosity results in difficulty in pumping the fluid, and other problems also are encountered in handling the relatively high viscosity fluid at the surface. These difficulties are especially acute when solid propping agents are added to the fracturing fluid.

Therefore, there is a need for a well service composition useful as a fracturing fluid which would be stable at a temperature of about 200° F. (93° C.) or higher. It is desirable if such a fracturing fluid is stable at temperatures up to 300° F. (149° C.) to 350° F. (177° C.), or higher (e.g. 450° F. (232° C.)). It is also desirable that such a fracturing fluid be stable and useable at temperatures lower than about 200° F. (93° C.), for example as low as about 100° F. (38° C.). Moreover, it is also desirable that a fracturing fluid exhibits low frictional resistance to the flow of the fluid in the well bore conduit during fracturing, while maintaining a desired high viscosity in a fracture.

SUMMARY OF THE INVENTION

Liquid or solid phosphate ester-monoester copolymer compositions are disclosed. As one of many advantages, embodiments of these compositions offer effective, economical and environmentally compatible replacements for hydrocarbon-based, viscous well treatment fluids. The compositions comprise a base fluid and a monoester copolymer of styrene and maleic anhydride. The compositions can further comprise an alkyl orthophosphate ester. The composition can contain additional components such as a crosslinking agent capable of increasing the viscosity of the composition.

Methods of making and using the compositions are also disclosed. The compositions can be used for various uses, including injection into a subterranean formation.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein. The components in the figures are not necessarily to scale, emphasis instead being placed upon clearly illustrating principles of the present invention.

FIG. 2 is a graph describing the change in viscosity over time of a fluid of the present invention that was heated to about 200° F. (93° C.).

FIG. 3 is a graph describing the change in viscosity over time of a fluid of the present invention that was heated to about 300° F. (149° C.).

FIG. 4 is a graph describing the change in viscosity over time of a fluid of the present invention that was heated to about 350° F. (177° C.).

FIG. 5 is a graph describing the change in viscosity over time of an alternative fluid of the present invention that was heated to about 350° F. (177° C.).

DESCRIPTION OF THE INVENTION

Figure 1:
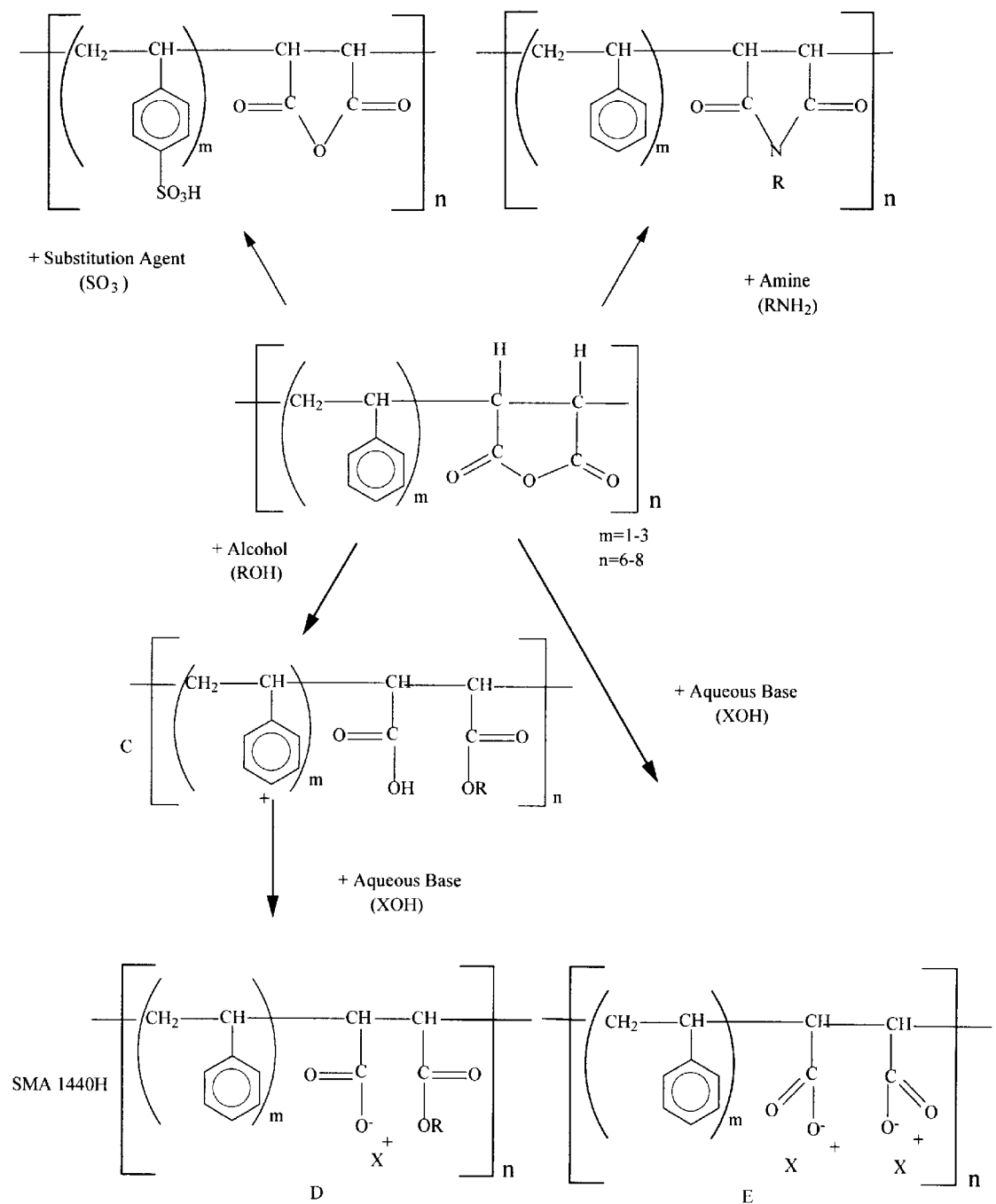
FIG. 1 is a chemical reaction scheme showing some of the reactions that an SMA (styrene and maleic anhydride) copolymer may undergo in addition to esterification reactions. These include substitution (A), imidization (B), and neutralization (D and E).

Embodiments of the invention provide a composition and a method of making and using the composition. The composition has many useful applications. For example, it can be used as a well service composition in hydraulic fracturing, gravel packing operations, water blocking, pipeline treatment, coil tubing, temporary plugs for purposes of well bore insulation and/or fluid control, etc. Although the composition is referred to hereinafter as "well service composition," it should be understood that the use of the term by no means limits its applications to well services.

The well service composition in accordance with some embodiments of the invention comprises: a base fluid and a monoester copolymer of styrene and maleic anhydride. The composition can further comprise an alkyl orthophosphate ester. The base fluid can generally be any base fluid. For example, the base fluid can be an organic base fluid, a hydrocarbon base fluid, or an aqueous base fluid. Preferably, the monoester copolymer of styrene and maleic anhydride should be at least partially soluble or dispersible in the organic base fluid. Preferably, a cross-linking agent capable of increasing the viscosity of the well service composition is used. The well service composition can form a gel with the aid of a gelling agent or a cross-linking agent. The term "gel" used herein refers to fluids that exhibit semi-solid elastic behavior.

An organic base fluid refers to any organic compound capable of forming an organic fluid gel, including those organic fluids employed in oil field, pipeline and refinery or chemical plant applications. Suitable organic base fluids include, but are not limited to, hydrocarbon-based fluids and other organic fluids. They include, but are not limited to, aliphatic, alicyclic and aromatic hydrocarbons, acids, ketones, aldehydes, ethylene glycols, polyethylene glycols, amines, alcohols, esters, derivatives of these compounds, and mixtures thereof. Specific examples of suitable aliphatic hydrocarbons include, but are not limited to, alkanes such as propane, n-butane, isobutane, n-hexane, n-octane, n-decane, n-tridecane, and related compounds. Other aliphatics include, but are not limited to, alkenes and alkadienes. Alicyclic compounds include, but are not limited to, cyclooctane, cycloheptane, cyclohexane, cyclopentane, cyclobutane, and the like. Specific examples of suitable aromatics include, but are not limited to, benzene, toluene, xylene, ethylbenzene and other alkyl benzene, naphthalene, and related compounds. Other examples include, but are not limited to, nonylphenols, ethoxylated nonylphenols, and the like. Particular examples of commercial aromatic products include, but are not limited to, "FRACSOL," "FRACSOL-S," "XYSOL" from Trysol of Calgary, Canada or Amsol of the United States.

Other examples of suitable organic base fluids include, but are not limited to, at least one of diesel, gasoline, kerosene, reformate, naphthalene, xylene, toluene, mineral oil, light mineral oil, condensate, crude oil, lubricating oils, or mixtures thereof (such as diesel mixed with condensate to lower API gravity). Other organic base fluids, such as alcohols (like methanol, ethanol, propanol, isopropyl alcohol, butanol, pentanol, hexanol, 2-methylhexanol, and similar compounds), alkanes (such as hexane), glycols (such as ethylene glycol "EB" available from Dow Chemical), ester materials (such as "RDPE" available from Rhone Poulenc), and derivatized alkanes (such as alkylhexanes), can also be employed. Other suitable organic fluids (including oily esters), are described in U.S. Pat. No. 5,519,063.

Also suitable are synthetic oils (including but are not limited to, synthetic hydrocarbon-base oils, ester-type oils, alkylene polymers, polysiloxanes, etc.), environmentally compatible (e.g., biodegradable) natural or synthetic organic base fluids such "ESCAID 90", "ESCAID 110" (from Exxon), BIO-BASE™ 637 (from Shrieve Chemical Products), ENVIRO-DRILL (from Newpark Drilling or Wells Cargo Oilfield Services) or "Distillate 822" (from Moose-Jaw Asphalt, Inc.), refined kerosene (such as "LOTOX" available from Exxon), "ALPHA OLEFIN" (from Baker Performance Chemical), "HYDROSOLV P150" or "HYDROSOLV B100" (from Shrieve Chemical Products), "ISOPAR L" or "ISOPAR M" (from Nalco-Exxon Chemical Company), etc. Natural organic based fluids, such as animal oils and vegetable oils, are also be suitable, including but not limited to, linseed oil, palm oil, cotton seed oil, rapeseed oil, soybean oil, olive oil, canola oil, sunflower oil, peanut oil, etc. Also suitable are one or more organic-based solvents known as in the art as "mutual solvents." Examples of such solvents include, but are not limited to, glycol-ethers, e.g., ethylene glycol monobutyl ether ("EGMBE"). These environmentally compatible oils and base fluids are suitable for use in conventional "green" oil drilling technologies, and feature such desirable characteristics such as high flash point and low aromatic content.

The organic base fluids described herein can be mixed or blended together as desired to provide an organic gel with desired characteristics. In some embodiments, an organic base fluid can be a liquid hydrocarbon that is at least one of diesel, condensate, or mixtures thereof. It should be understood that these organic base fluids are exemplary only, and that any suitable organic fluids can also be employed. Additional organic-based fluids suitable for use in the present invention are disclosed in the U.S. patent application Ser. No. 6,302,209.

Optionally, aqueous base compositions can be used in lieu of the organic base fluids, especially in applications which include natural polymers or synthetic polymers that are used in water or in aqueous environments.

Suitable monoester copolymer of styrene and maleic anhydride include, but are limited to, copolymers represented by Formula I:

Formula I

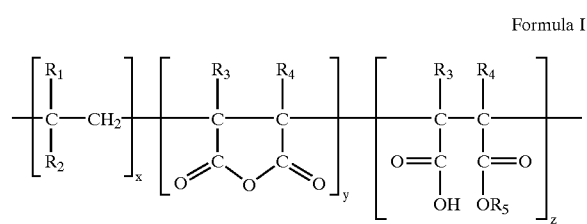

wherein x and z are any positive integer, such as 1, 2, 3, 4, 5, 6, 7, 8, 9, 10, ... 20, ... 30, 40, 50, 60, 70, 80, 90, 100, etc., y is zero or any positive integer, such as 1, 2, 3, 4, 5, 6, 7, 8, 9, 10, 20, 30, 40, 50, 60, 70, 80, 90, 100, etc., $R_1$ and $R_2$ can be the same or different, and individually are hydrogen, alkyl, aryl, aralkyl, cycloalkyl, and halogen (such as chlorine, fluorine, or bromine), provided that one of $R_1$ and $R_2$ is an aromatic group, such as phenyl or substituted phenyl groups. Preferably, $R_1$ and $R_2$ are the same or different, and individually are hydrogen, methyl, phenyl, benzyl, or cycloalkyl of four to six carbon atoms. $R_3$ and $R_4$ are the same or different groups which can be hydrogen or alkyl of one to about five carbon atoms. Preferably, $R_3$ and $R_4$ are the same or different, and individually are hydrogen or methyl. $R_5$ can be any organic functional group. For example, it can be alkyl, aralkyl, alkyl-substituted aralkyl radicals containing from one to about twenty carbon atoms, and oxyalkylated derivatives of such radicals containing from about two to about four carbon atoms in each oxyalkylene group, which can be of one to about twenty repeating units, preferably one to about six repeating units. In some embodiments, $R_5$ can include one or more unsaturated moieties and/or one or more heteroatom moieties.

Although the monoester copolymer is illustrated as block copolymer with three blocks of repeating units, the monoester copolymer need not be a block copolymer. For example, the three repeating units can be randomly distributed throughout the backbone of the polymer chains. It can also be an alternating copolymer. The percentage of monoester functionality can be represented by $$\frac{100xz}{(y+z)}.$$

In some embodiments, the monoester copolymer can optionally include a repeating unit with diester functionalities as illustrated in Formula II.

Formula II

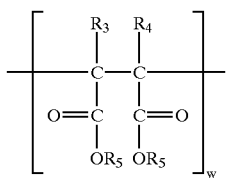

wherein w is zero or any positive integer, such as 1, 2, 3, 4, 5, . . . 10, . . . 20, . . . 30, . . . 100, etc. In this case, the percentage of monoester functionality is $$\frac{100xz}{(y+z+w)}.$$

Similarly, the percentage of diester functionality is $$\frac{100xw}{(y+z+w)};$$

and the percentage of maleic anhydride functionality is $$\frac{100xy}{(y+z+w)}.$$

Generally, the percentage of maleic anhydride functionality and the percentage of diester functionality individually can range from zero to about 50%, from zero to about 30%, or from zero to about 15%. The percentage of monoester functionality, in the polymer can range from about 5% to about 95%, from about 15% to about 90%, or from about 25% to about 85%. Specific examples of the monoester functionality percentage include, but are not limited to, about 25%, about 50%, about 65%, and about 85%. As such, the term "monoester copolymer" refers to a copolymer with one or more monoester functionalities. The percentage of monoester functionality need not be 100% or close to 100%, so long as it is not zero. Moreover, the use of the term "monoester" does not preclude the presence of diester functionality and/or maleic anhydride functionalities. In some embodiments, suitable copolymers can be a mixture of a monoester copolymer of styrene and maleic anhydride and a diester copolymer of styrene and maleic anhydride. The term "copolymer of styrene and maleic anhydride" or "styrene and maleic anhydride copolymer" refer to a class of copolymers obtained by copolymerizing styrene or its derivatives with maleic anhydride or its derivatives. Therefore, the term refers not only to the copolymer obtained from styrene and maleic anhydride, but also to derivatives of the styrene and maleic anhydride copolymer family.

In general, the monoester copolymers of styrene and maleic anhydride can be liquids or free flowing solids such as granular, pellet, or powder suitable for dispersing into the hydrocarbon, depending upon their molecular weight. These monoester copolymers are characterized by their number average molecular weight ($M_n$), their weight average molecular weight ($M_w$), their acid number, and their glass transition temperature ($T_g$). Specifically, they are characterized by a number average molecular weight of about 500 to about 20,000, preferably about 1,000 to about 10,000, more preferably about 2000 to about 7000, and preferably about 6200. The monoester copolymers of the invention are further characterized by a weight average molecular weight of about 1,000 to 30,000, preferably about 5,000 to about 20,000, and more preferably about 15,000. The acid number of these monoester copolymers is preferably about 50 to about 400, preferably about 100 to about 350, and more preferably about 110. The monoesters also possess a glass transition temperature of about 30° C. to about 150° C., preferably about 40° C. to about 150° C., and more preferably about 150° C.

Suitable monoester copolymers can be obtained by reacting a suitable alcohol with a styrene and maleic anhydride copolymer ("SMA copolymers"). They can also be prepared by copolymerization of appropriate monomers without further reactions. Any SMA copolymers can be used to react with an alcohol. For example, suitable SMA copolymers and the methods of making the copolymers are disclosed in the following U.S. Pat. Nos. 3,264,272; 3,511,820; 3,528,939; 3,650,970; 3,657,123; 3,741,943; 3,755,264; 4,284,414; 4,420,599; 4,450,261; 5,140,070; 5,330,588; 5,834,088; 5,998,545; and Re. 28,475. Additional suitable SMA copolymers are disclosed in U.S. Pat. Nos. 4,158,595; 4,361,669; 4,391,721; and 4,442,232.

Esterification of a SMA copolymer can generally be carried out by any procedure, such as those disclosed in U.S. Pat. Nos. 3,342,787, 4,722,947, and 5,948,843. Alcohol compounds which can be reacted with an SMA copolymer to form the ester functionality include, but are not limited to, $C_6$ or greater primary, secondary, and tertiary alcohols, including but not limited to, hexanol, isohexanol, 2-ethylhexanol, t-octanol, isooctanol, decanol, octadecanol (lauryl alcohol), tetradecyl alcohol, cetyl alcohol, oleyl alcohol, stearyl alcohol, and nonylbenzyl alcohol, as well as oxyalkylene derivatives of such alcohols wherein at least 1,2-alkylene oxide, such as ethylene oxide, 1,2-propylene oxide, and 1,2-butylene oxide, has been condensed therewith. Moreover, alcohols containing unsaturated moieties and/or heteroatom moieties can also be used to esterify a SMA copolymer. It should be understood that the above description with respect to suitable monoester copolymers of styrene and maleic anhydride is merely exemplary. Other forms of monoester copolymers, such as those disclosed in U.S. Pat. Nos. 3,536,461; 3,825,430; 4,401,793; 5,310,721; and No. 5,773,518, can also be used in embodiments of the invention.

Monoester copolymers of SMA encompass those referred to in the art as partial monoesters of styrene maleic anhydride copolymers and fatty alcohols ("MSMA's"), including but not limited to, MSMA's and derivatives of MSMA's (such as sodium salts of sulfonated MSMA's). Such compounds are typically available in resin form, and can be utilized in embodiments of the invention by direct combination with other components in an organic base fluid, or by prior dissolution in an organic solvent, such as toluene, xylene, or a mixture of solvents suitable for dissolution of the selected MSMA-based compounds.

Among suitable MSMA-based compounds are those compounds formed from styrene maleic anhydride copolymers formed via the following reaction:

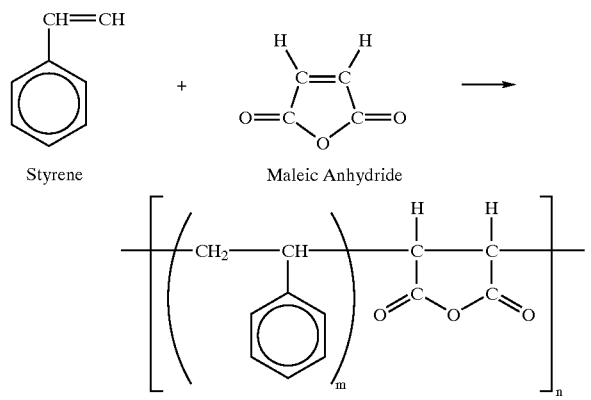

In some embodiments, m ranges from about 1 to about 3; n ranges from about 6 to about 8. It should be understood that values of m and n can vary outside these ranges.

Suitable MSMA compounds include, but are not limited to, those formed by the esterification of styrene maleic anhydride copolymer with one or more fatty alcohols as sperm oil by saponification and vacuum fractional distillation. Specific examples of saturated fatty alcohols include, but are not limited to, octyl, decyl, lauryl, myristyl, cetyl and stearyl alcohols, etc. Specific examples of unsaturated fatty alcohols include, but are not limited to, oleyl alcohol, linoleyl alcohol, linolenyl alcohol, and the like.

Although some MSMA compounds described above are formed from monofunctional alcohols, it should be understood that MSMA compounds formed from multifunctional fatty alcohols (difunctional, trifunctional, branched, and the like) are also possible. Branched chain alcohols suitable for use in the MSMA compounds of the invention are meant to include, but not be limited by, those branched chain alcohols with carboxyl functionalities. It is also possible to use partial esters of styrene maleic anhydride and alcohols other than fatty alcohols. In addition, partial esters of styrene maleic anhydride can be formed with other organic carbon chains with one or more carboxyl functionalities formed thereon. In those cases where multifunctional alcohols and/or alcohols with one or more carboxyl functionalities are employed, the properties of a gelled fluid can be varied and/or enhanced by virtue of additional hydroxyl sites available for complexation or reaction with metal groups supplied by metal source compounds.

Derivatives of MSMA compounds can also be employed in addition to or in place of MSMA compounds. Examples of such MSMA derivatives include, but are not limited to, MSMA compounds with aryl groups that are substituted or partially substituted. In one embodiment, sulfonated MSMA derivatives formed with the following structure are used:

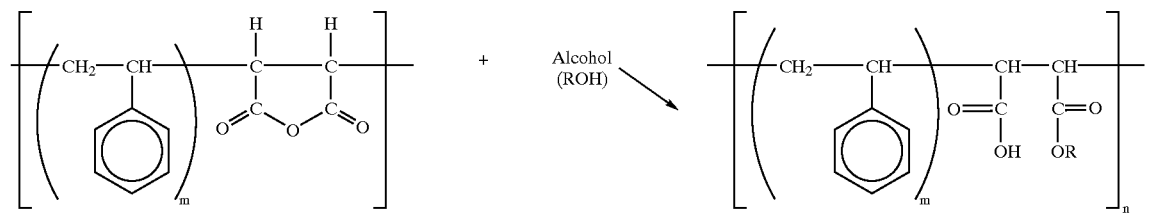

wherein m and n are defined above. In some embodiments, ROH represents a fatty alcohol in which R is a branched or straight carbon chain that can be saturated or unsaturated, wherein the branched chain alcohol can contain at least one carboxyl functionality, and which can have from about 8 to about 20 carbon atoms, from about 10 to about 25 carbon atoms, or from about 6 to about 38 carbon atoms. The degree of esterification of such MSMA compounds can vary from relatively little to almost complete esterification, e.g., from about 15% to about 90%, and more preferably about 35% to about 90%.

Specific examples of fatty alcohols for MSMA esterification include, but are not limited to, those produced by the Ziegler, modified-Ziegler, Idemitsu and Oxo (cf. Ullmann's Encyclopedia of Industrial Chemistry, 5$^{th}$ Ed, Vol. A1; pages 290–293) processes, reduction of vegetable oils and fatty acids with sodium, catalytic hydrogenation at elevated temperatures and pressures, and hydrolysis of spermacetia and

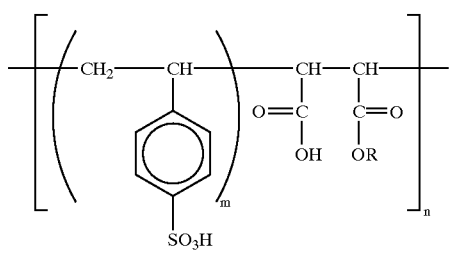

wherein m, n, and R have those values described above for MSMA compounds.

Further information on specific suitable MSMA-based compounds available under the trade name SMA® from Elf Atochem can be found in the following publications from Elf Atochem: "SMA Multifunctional Resins General Bulletin"; "The Use of SMA Resins as Multivalent Ion Complexation Agents" (Version 3.0, June 1998); "SMA Fatty Alcohol Esters"; and "Technical Information, Developmental Products, Sulfonated SMA Resins S-SMA X 1000 and S-SMA X 3000". As such, preferred monoesters of the present invention have alkyl chains containing from about 12 to about 24 carbon atoms (e.g. 12, 14, 16, 18, 20, 22, 24), $C_{12}$–$C_{24}$. Specific examples include, but are not limited to, MSMA compounds made from base SMA® resins SMA 1000, SMA 2000, SMA 3000, and SMA 4000, with styrene/maleic anhydride ratios of 1, 2, 3 and 4, respectively. Ester resins can be formed from SMA 1440, SMA 17352, SMA 2625 and SMA 3840. These compounds are available in aqueous solution and are designated with a "H" suffix. Additional suitable MSMA-based compounds include, but are not limited to, SMA X10840, SMA X11825 ($C_{18}$ fatty alcohol), SMA X11850 ($C_{16}$ to $C_{18}$ fatty alcohol) and SMA X31890 ($C_{18}$ fatty alcohol). Still others include, but are not limited to, SMA XGA-10, SMA XGA-30, SMA 1000F, SMA 1440F, SMA 17352F, SMA 2000F, SMA 2625F, SMA EF-30, SMA 3840F, SMA EF40, SMA 3000F, etc.

Additional examples of styrene maleic anhydride and styrene maleic anhydride derivative copolymer starting materials (i.e., which can be esterified), as well as MSMA-based compounds, can be found in U.S. Pat. Nos. 3,650,970; 3,657,123; 3,528,939, 3,511,820; 3,741,943, 4,284,414; 4,450,261; 5,076,852; 5,132,271, 5,330,588. Still other such information can be found in American Chemical Society Symp. Ser., 1983, Vol. 229, Iss. *Eff. Hostile Environ. Coat. Plast.* pp. 49–54; Japanese Kokai Tokyo Koho, May 16, 1984 (U.S. Pat. No. 8,484,933, patent application Ser. No. 83-184060); German Offen., May 22, 1969 (U.S. Pat. No. 1,800,712); and U.S. Pat. No. 1,482,171.

Optional "activator" materials can be added to a MSMA-containing formulation to achieve, among other things, reduced gellation time and/or smoother gels. In this regard, an activator can be any compound containing carboxylic acid functionalities, typically with a low carbon count. Examples include, but are not limited to, relatively low carbon count carboxylic acids, such as citric acid.

In addition to esterification reactions, a SMA copolymer can undergo other reactions, such as substitution, imidization, and neutralization. These reactions are illustrated in FIG. 1.

As illustrated in FIG. 1, polymers A, B, C, D, and E can be derivatized from a SMA copolymer. All of these derivatives of an SMA copolymer can be used in embodiments of the invention, in addition to or in place of a monoester copolymer.

Table I lists examples of suitable monoester copolymers of SMA available from AtoFina and their typical properties.

TABLE I

| | | Suitable Monoester Copolymers of SMA | | | |
|---|---|---|---|---|---|
| | | X10840 | X11825 | X11850 | X31890 |
| Composition Typical Properties | % Monoester | 65 | 25 | 50 | 85 |
| | Appearance | clear solid | clear solid | clear solid | clear yellow solid |
| | Acid Number | 240 | 315 | 215 | 110 |
| | Tg (° C.) | 85 | 110 | 90 | 45 |
| | $M_W$ (By GPC) | 5600 | 6800 | 8300 | 15000 |
| | $M_n$ (By GPC) | 2640 | 3200 | 3800 | 6200 |

TABLE I-continued

| | Suitable Monoester Copolymers of SMA | | | |
|---|---|---|---|---|
| | X10840 | X11825 | X11850 | X31890 |
| Solution Viscosity (cps) (For 20 wt. % Aq. NH$_4$OH Sol.) | 840 | 400 | NA | NA |
| Melt Viscosity Poise @T (° C.) (1 rad/sec) | 170@160 420@180 140@200 | — — — | — — — | 150@140 40@160 20@180 |

Suitable phosphate esters include, but are not limited to, the reaction product of a pentavalent phosphorus compound and an alcohol. It is presently preferred that an oxyalkene, such as oxyethylene, oxypropylene or oxybutylene, is also present as a reactant in order to yield an ether phosphate ester, and that the phosphate ester has compatibility with high asphaltene containing hydrocarbons, such as crude oils, as described by J. R. Becker (*Crude Oil Waxes, Emulsions, and Asphaltenes*, Pennwell Books; Tulsa, Okla.: 1997). The term "phosphate ester" or "alkyl orthophosphate ester" is used interchangeably herein to refer to one or more of the following structures:

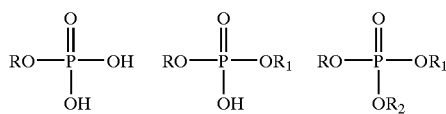

wherein R, $R_1$, $R_2$ are independently $C_1$–$C_{18}$ alkyl, $C_6$ aryl, $C_1$–$C_{12}$ alkyl or dialkyl $C_6$ aryl $C_1$–$C_{18}$ alkyl ether, $C_6$ aryl ether, or $C_1$–$C_{18}$ alkyl or dialkyl $C_6$ aryl ether. Any of R, $R_1$, and $R_3$ can have the following structures, respectively

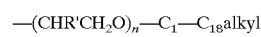

and

wherein R' is hydrogen, methyl or ethyl and n is an integer from 1 to 100.

The phosphate ester can be neutralized or non-neutralized. Commonly, the phosphate ester is non-neutralized. Under certain circumstances, at least a partially or fully neutralized phosphate ester may be used. Additional suitable phosphate esters include, but are not limited to, those described in U.S. Pat. Nos. 4,100,231; 4,200,540; 4,316,810; 4,174,283; 4,153,649; 4,622,155; 5,614,010; 5,514,645; 5,271,464; 3,505,374; 4,003,393; 5,417,287; 5,846,915; 6,054,417; and 6,149,693. It should be noted that salts of the aforementioned phosphate esters, such as aluminum salts as described in U.S. Pat. Nos. 4,316,810; 4,200,540; and 4,622,155, can also be used in embodiments of the invention.

Optionally, an enhancer can be used with a phosphate ester. A suitable enhancer generally is an amine, preferably an oxyalkylated amine. It can be represented by the following formula III, IV, and V:

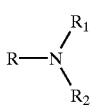

Formula III where R, $R_1$, and $R_2$ are independently hydrogen, $C_1$–$C_{18}$ alkyl, $C_5$–$C_6$ cycloalkyl, or

—(CHR'CH$_2$O)$_n$— wherein R' is hydrogen, methyl or ethyl and n is an integer from 1 to 100;

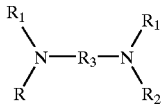

Formula IV where R is $C_1$–$C_{18}$ alkyl, $R_1$ is hydrogen, $C_1$alkyl or

—(CHR'CH$_2$O)$_n$— wherein R' is hydrogen, methyl or ethyl and n is an integer from 1 to 100 and $R_2$ is hydrogen; or

—(CHR'CH$_2$O)$_n$— wherein R' is hydrogen, methyl or ethyl and n is an integer from 1 to 100 and $R_3$ is $C_3$ alkyl; or

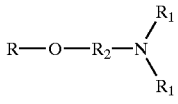

Formula V where R is $C_6$–$C_{18}$ alkyl, $R_1$ is hydrogen or

—(CHR'CH$_2$O)$_n$— wherein R' is hydrogen, methyl or ethyl and n is an integer from 1 to 100, and $R_2$ is $C_3$ alkyl.

Thus, suitable oxyalkylated amines as enhancers include, but are not limited to, oxyalkylated alkyl amines, such as ethoxylated alkyl amines with from 1 to about 100 moles of ethylene oxide per mole of amine and ethoxylated alkyl amines with from about 4 to about 18 carbon atoms in the alkyl group; polyoxypropylene alkyl amine with from 1 to about 100 moles of propylene oxide per mole of amine; and polyoxybutylene alkyl amine with 1 to about 100 moles of butylene oxide per mole of amine. Also included are oxyalkylated dialkyl amines such as ethoxylated dialkyl amines with from 1 to about 100 moles of ethylene oxide per mole of amine; polyoxypropylene dialkyl amine with from about 1 to about 100 moles of propylene oxide per mole of amine; polyoxybutylene dialkyl amine with from about 1 to about 100 moles of butylene oxide per mole of amine; oxyalkylated diamines; and oxyalkylated aryl amines. The aforementioned enhancers can be used alone or in combination with others.

The following is a partial list of suitable phosphate esters and enhancers for use with the present invention. All compounds listed are available from Ethox Chemical, LLC, Greensville, S.C., unless otherwise noted.

Enhancers: Am-1: an ethoxylated $C_{16}$–$C_{18}$ alkyl amine with two moles of oxyethylene per mole of amine; Am-2: an ethoxylated $C_8$ alkyl amine with two moles of oxyethylene per mole of amine; Am-3: an ethoxylated di-$C_4$ alkyl amine with one mole of oxyethylene per mole of amine; Am-4: an ethoxylated $C_{12}$–$C_{14}$ alkyloxy $C_3$ alkyl amine with three moles of oxyethylene per mole of amine; Am-5: N,N-di-$C_1$ alkyl $C_{16}$ alkyl amine; Am-6: N,N-di ($C_1$) alkyl $C_{18}$ alkyl amine; Am-7: $C_{16}$–$C_{18}$ imidazoline prepared from tall oil fatty acid and diethylenetriamine; Am-8: an alkoxylated $C_{16}$–$C_{18}$ alkyl amine with six moles of oxypropylene per mole of amine; Am-9: an ethoxylated di-$C_4$ alkyl amine with ten moles of oxyethylene per mole of amine; Am-10: an alkoxylated $C_{16}$–$C_{18}$ alkyl diamine with three moles of oxypropylene per mole of diamine; Am-11: N,N-di-$C_4$ alkyl amine; Am-12: an alkoxylated $C_{16}$–$C_{18}$ alkyl amine with two moles of oxybutylene per mole of amine; Am-13: an alkoxylated di-$C_4$ alkyl amine with one mole of oxybutylene per mole of amine; Am-14: an alkoxylated di-$C_4$ alkyl amine with one mole of oxypropylene per mole of amine; Am-15: dimethylaminopropylamine; Am-16: aminomethylpropanol; Am-17: an ethoxylated aniline with two moles of oxyethylene per mole of benzamine; G1—1: an ethoxylated tri-$C_{18}$ alkyl glyceride with five moles of oxyethylene per mole of glyceride; Et-1: an ethoxylated $C_{12}$–$C_{14}$ alkyl ether with three moles of oxyethylene per mole of ether; Es-1: an ethoxylated unsaturated $C_{16}$–$C_{18}$ fatty acid with three moles of oxyethylene per mole of fatty acid; Ph-1: phenol; Ph-2: $C_5$ di-tertiary-alkyl phenol; Al-1: isodecyl alcohol; and any ethoxylated alkyl amine as described in U.S. Pat. No. 6,342,468.

Phosphate Esters: PE-1: $C_2$, $C_8$, $C_{10}$ alkyl phosphate; EP-1: $C_2$, $C_8$, $C_{10}$ alkyl, $C_6$ aryl ether (one mole of oxyethylene per mole of $C_6$) phosphate ester with an alkyl/aryl composition of 31% $C_2$, 25% $C_8$, 30% $C_{10}$, 14% ethoxylated aryl; SASP-162 or ASP-160 (Nalco-Exxon Chemical Company); and HGA70 (Clearwater Inc.).

As mentioned above, a crosslinking agent (or a gelling agent) can be used to increase the viscosity of a well service composition. Any compound which is capable of increasing the viscosity of such a well service composition can be used. For example, one or more metal source compounds can be employed to impart characteristics of stable viscosity at relatively high temperatures.

Suitable metal source compounds include any metal-containing compound that can supply metal atoms capable of increasing the viscosity of a well service composition. Metal source compounds can include compounds with ionically or covalently bonded metal ions. Suitable metal ions include, for example, ions of metals from IUPAC Groups 1–14, IUPAC Groups 1–13, or IUPAC Groups 1, 2, 4, 8, and 3 of the periodic table. These metal ions are also identified in order number 11, 12, 13, 19, 20, 22, 24, 26 and 40 of the periodic table. Included are metal ions selected from the alkali earth and alkaline earth metal groups of the periodic table, as well as those metal ions selected from the transition metal groups of the periodic table. In one embodiment, metal ions can be selected from at least one of iron ions, aluminum ions, zirconium ions, titanium ions, chromium ions, sodium ions, potassium ions, calcium ions or mixtures thereof.

In some embodiments, metal source compounds may include a metal ion that has the capability of attaining an oxidation state of three (a "+3 valence"), such as aluminum, titanium, chromium, iron, zirconium, and the like. If desired, two or more metal sources containing metal ions in the III oxidation state (+3 valence) may be employed, as desired. It should be understood that these types of compounds are exemplary only, and that any other suitable metal source compounds, such as those having the capability of attaining an oxidation state of four, may also be employed.

Salts of carboxylic acid may be employed as metal source compounds. Suitable carboxylic acid salts include, but are not limited to, salts of branched, linear, saturated, unsaturated, aliphatic and/or aromatic carboxylic acids. Suitable metals for forming carboxylic acid salts include any metal selected from the same groups of the periodic table described herein for metal source compounds. Specific exemplary examples include, but are not limited to, carboxylic salts of the metals aluminum, iron, calcium, sodium, or mixtures thereof. Included are metals suitable for forming so-called heavy metal soaps of carboxylic or fatty acids.

For instance, a carboxylic acid salt may be at least one of an aluminum salt, iron salt or mixture thereof. Specific examples of such suitable carboxylic acid salts include, but are not limited to, aluminum salt of 2-ethylhexanoic acid (aluminum ethylhexanoate or aluminum octanoate), aluminum salt of 2-methylpentanoic acid (or aluminum methyl pentanoate), iron octanoate, aluminum stearate, or mixtures thereof. In one embodiment, a carboxylic acid salt is aluminum octanoate.

Other metal source compounds and mixtures of metal source compounds may be employed in addition to, or in place of, salts of the carboxylic acid. Some exemplary compounds are listed in the following paragraphs, although it should be understood that other suitable metal source compounds can be employed.

Examples of suitable metal source compounds include, but are not limited to, metal salts other than salts of carboxylic acids, metal alkoxides, metal oxides, metal hydroxides, metal halides, metal sulfates, metal ammonium sulfates, metal-containing organic, metal-containing inorganic, or mixtures thereof. Specific examples of suitable other metal salts (other than carboxylic acid salts) include, but are not limited to, aluminum hydroxide, aluminum oxide, aluminum sulfate, and aluminum chloride. Examples of suitable metal alkoxides include, but are not limited to, linear or branched metal alkoxides. Specific examples of suitable metal alkoxides include, but are not limited to, aluminum isopropoxide, aluminum butoxide, aluminum methoxide, iodine pentoxide, lithium butoxide, lithium methoxide, lithium t-butoxide, palladium methoxide, potassium t-butoxide, sodium butylate, sodium ethoxide, sodium methoxide, tin ethoxide, titanium isopropoxide, titanium methoxide, zirconium butoxide, zirconium 1-butoxide, zirconium ethoxide, zirconium 2-ethythexanoate, zirconium isopropoxide, zirconium (IV) 2,4-pentanadlonate, zirconium (IV) n-propoxide, tin (IV) isopropoxide, titanium (IV) n-propoxide, aluminum acetate, aluminum n-butoxide, aluminum tert-butoxide, aluminum calcium isopropoxide, ferric 2-ethylhexanoate, titanium (IV) n-butoxide, titanium (IV) cresylate, titanium (IV) isopropoxide, aluminum acetylacetonate, aluminum 2-ethythexanoate, aluminum tri-sec-butoxide, aluminum triethoxide, and aluminum salt of benzoic acid. Specific examples of suitable metal oxides include, but are not limited to, aluminum oxide, magnesium oxide, iron oxide, calcium oxide, or mixtures thereof. Specific examples of suitable metal hydroxides include, but are not limited to, aluminum hydroxide, sodium hydroxide, iron hydroxide, ammonium hydroxides, magnesium hydroxide, calcium hydroxide or mixtures thereof. Specific examples of suitable metal sulfates include, but are not limited to, aluminum sulfate, iron sulfate, ferric ammonium sulfate, magnesium sulfate, or mixtures thereof. Specific examples of suitable metal ammonium sulfates include, but are not limited to, ferric ammonium sulfate, ferric ammonium citrate, or mixtures thereof. Other possible salts include, but are not limited to, aluminum acetate, ferric acetylacetonate, ferric benzolacetonate, and ferric oxide. Other suitable metal sources include, but are not limited to, metal chelates such as chelates of acetyl acetonate (2,4 pentanedione) and other similar organic compounds (ketones, diketones, etc.) Exemplary compounds include, but are not limited to, aluminum-2,4 pentanedione, aluminum lactate or mixtures thereof. Similarly, other possible salts can include iron hydroxide and ferric-2,4 pentanedione.

The aforementioned metal source compounds are either commercially available or can be prepared by known chemistry. For example, aluminum salts are available from Chattem, Inc., Chattanooga, Tenn., under the trade name of AIP (aluminum isopropoxide, Al content: about 13%), VISCO MASTER 2200 (liquid aluminum alkoxide, Al content: 10.2% to 10.8%), MANALOX® 130 (liquid aluminum trialkoxide, Al content: 10.2 wt. %) and TRI-XL LV (low viscosity cyclic trimer of tri-oxy-aluminum isopropoxide in a severely hydrotreated paraffinic hydrocarbon oil, Al content: 12.5%). These and other metal salts are also available from other chemical suppliers, such as Alfa Aesar, Rhodia, A Johnson Matthey Company, and Fisher Scientific.

In the case of water sensitive materials such as aluminum isopropoxide, it is usually desirable to combine the water sensitive material with a non-aqueous base fluid prior to combination with organic base fluid, so as to prevent reaction with water.

Combinations of more than one metal source with a carboxylic acid, such as a fatty acid, can be employed to vary gelling time and/or to vary gelled fluid characteristics. Type and combinations of organic base fluids can also be used to vary gelling time. Combinations of multiple metal sources can include combinations of two or more of the metal source compounds described herein. In one embodiment, aluminum isopropoxide and aluminum hydroxide can be combined with carboxylic acid in a molar ratio of from about 1 to about 9 moles of aluminum isopropoxide per mole of aluminum hydroxide to achieve the desired effects.

In some embodiments, one or more aromatic organic base fluids can be present with or without other organic base fluids to accelerate gellation rate, for example, in a continuous mix process. In this regard, one or more aromatic compounds can be added to facilitate dissolution of the compounds to decrease time for gellation of an organic fluid, or can be employed as an organic base fluid. Suitable aromatic compounds include, but are not limited to, benzene, naphthalene, xylene, toluene, and derivatives and mixtures thereof. For example, xylene proportioned with diesel at a desired ratio, for example from about 15% to about 95% (alternatively from about 75% to about 95%) diesel by weight of the total organic base fluid mixture, and from about 85% to about 5% (alternatively from about 25% to about 5%) xylene by weight of the total organic base fluid mixture. It should be understood that greater amounts of aromatics, including up to about 100% aromatic (such as xylene) can be employed.

Any relative amount of one or more metal source compounds, optionally combined with one or more carboxylic acids, is suitable for at least partially viscosifying or gelling organic fluids disclosed herein. In some embodiments, mono carboxylic acids can be combined with aluminum source compound(s) in amounts sufficient to achieve a molar ratio of about 3 moles of monocarboxylic acid to about 1 mole of aluminum, including any carboxylic acid groups supplied by carboxylic acid salt present. In embodiments employing dicarboxylic acids, dicarboxylic acid can be combined with aluminum metal source compound(s) in an amount sufficient to achieve a molar ratio of about 1.5 moles of dicarboxylic acid to about 1 mole of aluminum, taking into account any carboxylic acid salt present. However, complete interaction between metal sites and carboxyl groups is not necessary to achieve other molar ratios (greater or lesser), are possible. Furthermore, by varying the ratio of carboxyl groups to metal sites (from ratios less than stoichiometric to ratios greater than stoichiometric), viscosity characteristics can be varied. For example, suitable ranges of molar ratios of aluminum to carboxylic acid for monocarboxylic acid formulations can be from about 1 to about 11, from about 2 to about 10, or from about 3 to about 7.

In addition to the above described components, one or more other additives can be employed to alter the characteristics of a gelled organic fluid. Such additives include any additive that is suitable for altering the characteristics of, for example, a liquid hydrocarbon gel, or for assisting with or modifying the combination or reaction of individual ingredients to form such gels. Examples of such additives which can be employed include, but are not limited to, non-emulsifiers and/or surfactants.

In one embodiment, optional surfactant(s) can be employed to facilitate interaction between two or more of the components in a mixture. Any surfactant capable of behaving as hydrotopes can be used. Both ionic (anionic and cationic) and non-ionic surfactants can be used. Mixtures of anionic and nonionic or cationic surfactants and nonionic surfactants are also possible. Examples of suitable surfactants types include, but are not limited to, linear alkyl benzene sulfonates, ethoxylated fatty alcohols, nonylphenols, fatty acid-derived amines, alkoxylated fatty amines, or mixtures thereof. Specific examples of suitable surfactants include, but are not limited to, sodium dodecylbenzenesulfonate ("DDBSA"), isopropyl alcohol, etc. Other suitable surfactants include, but are not limited to, ethoxylated fatty alcohols, propoxylated fatty alcohols, ethoxylated fatty amines, amines oxides, alkylbenzene sulfonates, alkyldimethylbenzyl ammonium chloride, cocoamidopropyl bentaine, ethoxylated fatty acids, propoxylated fatty acids, sulfonated fatty acids, and glycerol ethoxylates. Specific examples include, but are not limited to, linear sodium alkylbenzene sulfonate, linear TEA alkylbenzene sulfonate, branched calcium alkylbenzene sulfonate, branched amine alkylbenzene sulfonate, linear alkylbenzene sulfonic acid, branched alkylbenzene sulfonic acid, sodium xylene sulfonate, ammonium xylene sulfonate, sodium cumene sulfonate, 4 EO ammonium lauryl ether sulfate, 4 EO sodium lauryl ether sulfate, 30 EO sodium lauryl ether sulfate, 30 EO ammonium lauryl ether sulfate, 12 EO ammonium lauryl ether sulfate, 12 EO sodium lauryl ether sulfate, 4 EO ammonium nonyl phenol ethoxylate sulfate, 4 EO sodium nonyl phenol ethoxylate sulfate, 3 EO sodium octyl phenol ethoxylate sulfate, sodium olefin sulfonate, octane sulfonate salt, alkylamine alkylbenzene sulfonate, alkylbenzene sulfonic acid, coconut diethanolamide, oleic diethanolamide, modified fatty alkanolamide, ethoxylated cocoamide, ethoxylated (10) oleic acid, ethoxylated (4) stearic acid, ethoxylated (15) tall oil acid, POE (23) oleyl alcohol, POE (35) oleyl alcohol, POE (3) $C_{16}$–$C_{18}$ alcohol, POE (20) $C_{16}$–$C_{18}$ alcohol, POE (25) $C_{16}$–$C_{18}$ alcohol, POE (20) $C_{18}$ alcohol, ethoxylated coconut glyceride, polyoxyalkylene coconut glycerides, and polyoxyalkylene castor oil. These surfactants are available, for example, from Akzo Nobel, Witco, Stepan, and Ethox. Additional suitable surfactants such as alpha-olefin sulfonates are disclosed in U.S. Pat. No. 6,302,209.

Specific suitable hydrotopes and/or non-emulsifiers include, but are not limited to, compounds which are compatible with the chosen gelled fluid system but can be used to ensure water-wetting of a formation during a hydrocarbon-based fracturing treatment. Specific examples include, but are not limited to, a mixture of dodecylbenzene sulfonic acid salt and Pan Acid (known as "NE-110W" and available from Baker Performance Chemicals), and a mixture of isopropyl alcohol ("IPA") and DDBSA (known as "NE-118" and available from Baker Performance Chemicals). A non-emulsifier refers to a compound which is capable of preventing the formation of an emulsion between a water phase and an oil phase. Some non-emulsifier can also water-wet the surface of rock, which can be desirable in a gas well. A non-emulsifier can be ionic (both cationic and anionic) and neutral. Any known and unknown non-emulsifiers can be used in embodiments of the invention.

Gellation rate can vary as a function of selected individual components, relative amounts of components, temperature, solid component particle sizes, amount of shear imposed on the fluid, etc. For any given metal source(s), small solid component particle size, higher temperatures, presence of surfactant and/or aromatics, greater amounts of metal source compound relative to carboxylic acid, and greater amounts of shear are some of the variables that typically result in faster gel development. Ultimate viscosity of an organic liquid get can be controlled, for example, by varying relative amounts of carboxylic acid and one or more metal source compounds.

In some embodiments, a carboxylic acid-based soap can first be formed to achieve early gellation. Such a soap can be formed using any method and/or compounds known in the art for forming such soaps. The viscosity imparted by such a soap can be varied by composition and identity of metal components employed, with formation of heavy metal soaps (using metals such as aluminum, calcium, cobalt, lead, zinc, zirconium, etc.) achieving greater viscosities than soaps formed with lighter metals such as sodium. If desired, additional metal source compound(s) can be employed in conjunction with formation of such as soap to further modify the rheological properties of the gelled fluid. In some instances, this is done on a delayed basis, so as to achieve further viscosification after a desired period of time, such as to allow displacement of a fluid into a wellbore prior to further viscosification.

In other embodiments, a metal source compound (including but not limited to, metal hydroxide source compound such as sodium hydroxide, aluminum hydroxide, potassium hydroxide, etc.) can be combined with carboxylic acid (such as tall oil fatty acid from Arizona Chemical or Acme-Hardesty) and an optional metal salt of carboxylic acid (such as 325 mesh aluminum octoate carboxylic acid salt from Witco, and/or 100 mesh to 325 aluminum stearate from Acme Hardesty) to achieve early viscosification of an organic fluid followed by delayed viscosification at higher temperatures.

Other optional components which can be employed in the well service composition include, but are not limited to, friction reducer components, such as those formed by incorporation of high molecular weight neutralized cross-linked anionic polymers into a gelled organic fluid. Such friction reducing compounds can be used to reduce frictional drag in flow through pipes or conduits, for example, in a manner as described in U.S. Pat. No. 4,780,221.

In one embodiment, invert emulsion materials, such as "FRO 18" or "FRO 19" from BJ Services, can be employed.

In another embodiment, an anionic polymer can be used, including but not limited to, homopolymers of acrylic acid or methacrylic acid, or copolymers of these acids or their salts, esters or amides with one or more ethylenically unsaturated monomers (like styrene, maleic acid, maleic anhydride, 2-hydroxyethyl acrylate, acrylonitrile, vinylacetate, ethylene, propylene, etc.).

When friction reducing characteristics are desired, polyacrylic acids can be neutralized with an organic base, for example, an organic amine, including but not limited to, ethanolamines, such as diisopropanolamine, triethanolamine, diethanolamine, ethyl diethanolamine, diethylethanolamine, N-methyldiethanolamine, triamylamine, b-dimethylaminopropionitritite, dodecylamine, morpholine, di-2-(ethyl hexyl) amine, and mixtures thereof. Examples of commercially available organic amines include, but are not limited to, "ETHOMEEN" from BASF-Wyandette Corp., "JEFFAMINE D-1000" from Huntsman Chemical, "ARMEEN" from Armak Industrial Chemical Division, and "ALAMINE 7D" from Henkel Corporation. Additional examples of suitable anionic polymers, organic bases, other components and methods of using the same can be found in U.S. Pat. No. 5,641,890. Other examples of polyamines and methods of manufacturing the same can be found, for example, in U.S. Pat. Nos. 4,615,393; 4,780,221; EP Patent Application No. 88305437.1 (Publication No. 0 295 877); EP Patent Application No. 86305124.9 (Publication No. 0 207 787); EP Patent Application No. 89303738.2 (Publication No. 0 338 738); and EP Patent Application No. 87310946.6 (Publication No. 0 271 362).

Table II gives a partial list of exemplary additives that can be employed to vary particular characteristics of a gel. It should be understood that the characteristics, as well as the listed components, are not exclusive and are exemplary only and that two or more individual components can be combined in various ways, both with the same category, and across categories.

TABLE II

| Desired Characteristics | Exemplary Additive Types | Exemplary Specific Additives |
| --- | --- | --- |
| Decreased Initial Gel Time | Metal Hydroxides Aromatic and Derivatives Thereof | Sodium hydroxide, Aluminum hydroxide, Tall Oil fatty acid, Aluminum isopropoxide, Toluene, xylene, benzene, Fracsol S ®, Xysol ® |
| High Temperature Viscosity Stability | Carboxylic Acids Carboxylic Acid Salts Refined Oils | Aluminum isopropoxide, Aluminum octoate, Tall Oil fatty acid, Aluminum oleate, Diesel, kerosene, reformate |
| Delayed Viscosity Development at Higher Temperatures | Carboxylic Acids Carboxylic Acid Salts | Aluminum isopropoxide, Aluminum octoate, Tall Oil fatty acid, Aluminum oleate |

The well service composition in accordance with embodiments of the invention can include a breaking agent or a breaker. The term "breaking agent" or "breaker" refers to any compound that is capable of reducing the viscosity of a gelled fluid. In hydraulic fracturing, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow into the well bore. This reduction in viscosity of the treating fluid is commonly referred to as breaking. Consequently, the chemicals used to break the viscosity of the fluid is referred to as a breaking agent or a breaker.

There are various methods available for breaking a fracturing fluid or a treating fluid. A breaker material can be combined with other components of a gelled fluid prior to introduction of the fluid downhole. Alternatively, it can be formulated such that a gelled fluid viscosity is substantially maintained or increased during the time the fluid is displaced downhole and into the formation but is decreased after sufficient time has occurred to allow transport of proppant into the subterranean formation.

Any material capable of reducing the viscosity of a gelled fluid can be employed as a breaker. Some breakers can achieve the desired result by reacting or interacting with metal atoms or ions therein so as to reduce the viscosity of the fluid by tying up a portion of the metal ions or atoms therein. Examples of suitable breaker materials include, but are not limited to, compounds with a relatively higher affinity for metal ions, such as sequestering agents, metal chelating agents, etc. Specific examples of suitable breaker materials include, but are not limited to, amines, acids, acid salts, acid-producing materials, oxylates, etc. Specific examples of suitable acids include, but are not limited to, oxalic acid, aminopolycarboxylic acids (e.g., ethylene diaminetetraacetic acid ("EDTA"), ethyleneglycolbis (beta-aminoethyl ether)-NN,-tetraacetic acid, nitrilotriacetic acid, and similar compounds), hydroxycarboxylic acids (e.g., gluconic, tartaric, citric acids), and salts and mixtures thereof. Specific examples of suitable acid salts include, but are not limited to, salts of oxalic acid, the sodium salt of citric acid, the sodium salt of tartaric acid, and the sodium salt of gluconic acid. Specific examples of suitable oxylates include, but are not limited to, calcium oxylate, and similar compounds. Specific examples of suitable amines include, but are not limited to, hexamethylene tetraamine, triethylenepentamine ("TEPA"), and related compounds.

A breaker material can be a solid (such as citric acid-based acid) or in another form that partitions over time into a gelled fluid where it can interact with metals in the gelled fluid. Alternatively, a breaker material can be encapsulated or coated with another material (such as polyvinylidene chloride) that breaks down over time to allow partitioning of the breaker material into the gelled fluid. Any encapsulation method can be used. For example, encapsulated breaker materials can be formed by impregnating particulate carrier material with breaker materials. Examples of suitable particulate carrier materials include, but are not limited to, those made from individual porous particles of material impregnated with a breaker material and coated with another material (such as polyvinylidene chloride) selected to dissolve or otherwise break down in the gel so as to allow diffusion or dispersion of the breaker material into the gel. Other encapsulation techniques, such as those disclosed in U.S. Pat. Nos. 4,506,734; 4,741,401; 5,110,486; 5,497,830; 5,948,735; and 3,163,219, can also be used.

In some embodiments, sodium metaborate, calcined magnesium oxide, tetraethylenepentaamine, and hexamethylenetetraamine are used as breaker materials, individually or in combination. Calcined magnesium oxide is available from Martin Marietta as 325 mesh under the trade name of Mag Chem 10 or from BJ Services under the trade name of RG-35. Hexamethylenetetraamine is available from Spectrum Chemical Manufacturing Corporation, Gardena, Calif., and tetraethylenepentamine is available from Fritz Industries, Inc., Dallas, Tex. under the trade name of En Cap 90706. Similar or different breaker materials from other suppliers can also be used in embodiments of the invention.

As described above, a well service composition can include various components, some of which are optional. Table III below exemplifies some presently preferred compositional ranges for the composition. It should be understood that compositions outside the indicated ranges are also within the scope of the invention.

TABLE III

EXEMPLARY COMPOSITION RANGES*

| Component | Wide Range (wt. %) | Medium Range (wt. %) | Narrow Range (wt. %) |
|---|---|---|---|
| Monoester copolymer | 0.1–15 | 0.15–2 | 0.2–1.5 |
| Phosphate ester | 0.1–35 | 0.5–20 | 0.75–10 |
| cross-linking agent | 0.001–5.0 | 0.005–2.0 | 0.01–1.0 |
| breaking Agent | 0.001–2.0 | 0.005–0.5 | 0.01–0.12 |
| proppant | 3–300 | 6–180 | 12–96 |
| surfactant | 0.001–5.0 | 0.005–2.0 | 0.01–1.0 |
| non-emulsifier | 0.001–5.0 | 0.005–2.0 | 0.01–1.0 |
| pH buffer | 2–14 | 2–13 | 8–12 |

*note: each weight percentage is based on the total weight of the organic base fluid.

The well service composition in accordance with embodiments of the invention can include a proppant. Suitable materials from which the proppant can be made include sand (e.g. 20–40 mesh), bauxite, man-made intermediate strength or high strength materials, and glass beads. Optionally, the proppant can be coated with a resin of a type and in an amount that will permit consolidation of the proppant particles into a mass, for example when subjected to the elevated temperatures and pressures of the formation.

The well service composition in accordance with embodiments of the invention can be prepared by any method. For example, all desired components can be mixed together simultaneously or premixed in some manner to facilitate subsequent mixing. In some embodiments, it may be necessary to heat the mixture to an elevated temperature, such as from about 100° C. to about 250° C. After a well service composition is prepared, it can be injected through a well bore into a subterranean formation.

The well service composition in accordance with embodiments of the invention has many useful applications. Examples of its applications include, but are not limited to, well treatment fluids (including stimulation fluids, such as fracture fluids, matrix stimulation fluids, acidizing fluids, hydrocarbon-based treatment fluids etc.), drilling fluids (such as drilling muds, drill-in fluids, workover fluids, packer fluids, completion fluids, fluids for use with coil tubing, etc.), pipeline treatment fluids (such as gelled pipeline pigs, separation plugs, etc.) as hydrocarbon friction reducer compositions in pipeline and other tubular applications (e.g., for use with crude oil, refined oil, and other hydrocarbons), process facility treatment fluids (such as gelled fluids for cleaning and/or chemically processing equipment used in oil fields facilities, refineries, chemical plants, refineries, etc.). Well treatment or pipeline treatment using the well service composition can be conducted according to any method, such as those disclosed in the following U.S. Pat. Nos. 5,609,207; 5,552,377; 5,492,137; 5,411,091; 5,382,411; 5,381,864; 5,082,059; 5,057,233; 4,877,894; 4,665,982; 4,404,112; 4,301,868; 4,186,802; 3,757,864; 3,654,992; 3,654,991; 3,654,990, 5,419,183; 5,197,324; 4,635,721, 4,543,131, 4,416,703; 4,252,466; 4,003,393; and 5,145,590. Techniques for hydraulically fracturing a subterranean formation, for example, will be known to persons of ordinary skill in the art, and will involve pumping the fluid of the invention into the borehole and out into the surrounding formation. The fluid pressure is above the minimum in situ rock stress, thus creating or extending fractures in the formation.

EXAMPLES

The following examples are presented to illustrate a few embodiments of the invention. None of the examples are intended, nor should they be construed, to limit the invention as otherwise described and claimed herein. All numerical values are approximate, regardless of whether the word "about" or "approximate" is used in describing the numerical values. Numerical ranges, if given, are merely exemplary. Embodiments outside the given numerical ranges can nevertheless fall within the scope of the invention as claimed.

Example 1

Materials and Sources

In the following examples, various starting materials are described by their acronyms, such as XLO-6, OGA-2, EG-2, and GSO-1. These acronyms are arbitrary and do not have a set meaning. EG-2 refers to an alkyl orthophosphate ester (which is described in U.S. Pat. No. 6,149,693) available from Ethox Chemical, LLC, Greenville, S.C. GSO-1 refers to a monoester copolymer of SMA dissolved in organic solvents, such as xylene and ethyl benzene. The monoester copolymer of SMA was obtained from AtoFina, Houston, Tex. under the trade name of SMA® X31890.

The composition of GSO-1 is an SMA dissolved in an aromatic organic solvent. It is comprised of about 30 wt. % alkyl ester, modified styrene, and maleic acid copolymer, combined with about 11 wt. % to about 18 wt. % ethyl benzene, and about 53 wt. % to about 60 wt. % xylene.

XLO-6 is a mixture of aluminum alkoxide in xylene. OGA-2 is a blend of esters and surfactants in aromatic solvent. XLO-6 is comprised of a first aluminum alkoxide (about 58 wt. %), a second aluminum alkoxide (about 25 wt. %), and xylene (about 17 wt. %). OGA-2 is comprised of benzoic acid (less than about 10 wt. %), ethyl benzoate (less than about 15 wt. %), naphthalene (less than about 5 wt. %), xylene (less than about 35 wt. %), and an aromatic hydrocarbon solvent (less than about 5 wt. %). Various examples were made by using one or more of the aforementioned starting materials.

Example 2

Evaluation at 200° F. (93° C.)

Off-road diesel was mixed with OGA-2, GSO-1 and EG-2 according to the following ratios: for 1000 gallons (3,785 L) of off-road diesel, four gallons (15 L) of OGA-2, five gallons (19 L) of GSO-1, and fifteen gallons (57 L) of EG-2 were mixed.

The viscosity of the above-mixture was measured on a FANN rotational viscometer according to the following procedure. First, a 45 ml sample of the mixture was delivered to a FANN 50C rotational viscometer rotor cup. The sample was then mounted on the viscometer and pressurized to 300 psi with nitrogen. The viscometer was zeroed, its viscosity measurement initiated, and viscosity measurement taken as heating was applied. The rheological characteristics of the gel obtained in this example were evaluated at 200° F. (93° C.) over a period of 800 minutes using a FANN 50C rheometer. The graph in FIG. 2 summarizes the data obtained from this viscosity measurement. As shown, there is a significant degree of increased viscosity of the composition at 200° F. (93° C.). Furthermore, the increases in viscosity are maintained at 200° F. (93° C.) for a period of over 12 hours, indicating the composition's stability at temperatures similar to subterranean locations over extended periods of time.

Example 3
Evaluation at 300° F. (149° C.)

The procedures of Example 1 were repeated except that 4 gallons per 1,000 gallons of fluid (4 liters per 1,000 liters of fluid) of OGA-2 and 5 gallons per 1,000 gallons of fluid (5 liters per 1,000 liters of fluid) of XLO-6 were mixed with off-road diesel. The rheological characteristics of the gel obtained in this example were evaluated at 300° F. (149° C.) over a period of 800 minutes using a FANN 50C rheometer. The data obtained in this example yielded the viscosity data summarized in FIG. 3. These results indicate that as temperatures approach 300° F. (149° C.; such as in subterranean locations downhole), the viscosity of the composition increases, suggesting increased well treatment (i.e. fracturing) capabilities in situations where such temperatures are encountered. Furthermore, the increases in viscosity are maintained at a steady value for a period greater than 12 hours, indicating the composition's stability at such elevated temperatures.

Example 4
Evaluation at 350° F. (177° C.)

The procedures of Example 1 were repeated except that 4 gallons per 1,000 gallons of fluid (4 liters per 1,000 liters of fluid) of OGA-2 and 5 gallons per 1,000 gallons of fluid (5 liters per 1,000 liters of fluid) of XLO-6 were mixed with off-road diesel. The rheological characteristics of the gel obtained in this example were evaluated at 350° F. (177° C.) over a period of 800 minutes using a FANN 50C rheometer. The data obtained in this example yielded the viscosity data summarized in FIG. 4. As shown, as the temperature surrounding the composition rises to 350° F. (177° C.), the viscosity of the composition increases fairly quickly, then levels off and remains relatively constant over time. Additionally, this steady increased velocity is maintained for extended periods of time (greater than 12 hours), indicating the long-term stability of this composition at elevated temperatures.

Example 5
Evaluation at 350° F. (177° C.)

The procedures of Example 1 were repeated except that 4 gallons per 1,000 gallons of fluid (4 liters per 1,000 liters of fluid) of OGA-4, 5 gallons per 1,000 gallons of fluid (5 liters per 1,000 liters of fluid) of GSO-1, and 5 gallons per 1,000 gallons of fluid (5 liters per 1,000 liters of fluid) of XLO-6 were mixed with off-road diesel. The rheological characteristics of the gel obtained in this example were evaluated at 350° F. (177° C.) over a period of 800 minutes using a FANN 50C rheometer. The viscosity data obtained in this example yielded the graph of FIG. 5. These results indicate that as the temperature of the environment around the composition approach 350° F. (177° C.), the viscosity is increased rapidly and then maintained in a steady fashion over time. In addition, this steady increase in viscosity is maintained over time (greater than 4 hours), indicating the mixture's long-term stability at 350° F. (177° C.).

Examples 2–5 show that the gels obtained in accordance with the embodiments of the invention are stable, i.e., the gels were able to maintain the desired viscosity, at temperatures from 200° F. (93° C.) to as high as 350° F. (177° C.) or higher for the duration of the assays. Moreover, some gels made in accordance with embodiments of the invention exhibit thermal stability at temperatures as high as 400° F. (204° C.) or 450° F. (232° C.). In addition to the thermal stability, the gels exhibit a relatively lower n' and a relatively higher K'. These physical properties are desirable because such gels would exhibit relatively lower resistance when flowing through a conduit into a formation. Once in the formation, such gels would exhibit a relatively higher viscosity to enable the formation of cracks with the desired geometry.

Example 6
Composition Made With Solid Materials

A composition made by combining solid materials and a liquid base fluid was designed and prepared. Solid/granular aluminum 2-ethylhexanoic acid (Calford(r) G-760 from H. L. Blackford, Ltd) (89 wt. %) was mixed with a solid modified SMA (SMA X-31890) having a glass transition temperature ($T_g$) of 70° C. (11 wt. %) in a mortar and pestle. This mixture was added at a ratio of 75 lbs/1000 gallons (9 g/l) into 250 mL of #2 off-road Diesel in a Hamilton Beach Mixer at low speed (moderate shear) for 2 minutes at 25° C. The rheological characteristics of the gel obtained in this example were evaluated at 250° F. (121° C.), 300° F. (149° C.), and 350° F. (177° C.) using a FANN 50C rheometer. The results were consistant with the previously reported results in FIGS. 2–5.

As demonstrated above, embodiments of the invention provide a new well service composition useful in hydraulic fracturing, water control, coil tubing, pipeline treatments, well completion, gravel packing, and other well services. The well treatment composition can have one or more of the following advantages. First, it is thermally stable at a relatively higher temperature, such as from about 200° F. (93° C.) to about 350° F. (177° C.). Some gels may be thermally stable at temperatures as high as 400° F. (204° C.) or 450° F. (232° C.). Moreover, these same gels are capable of exhibiting stability and functionality at temperatures lower than 200° F. (93° C.), for example, as low as about 100° F. (38° C.). Furthermore, the gelling materials of the present invention are capable of maintaining viscosities at these elevated temperatures for sustained (>800 minutes, or 13 hours) periods of time. Second, it is possible to use a relatively lower amount of gelling materials while still achieving a desired viscosity. Although the well service composition is stable at high temperatures, it can also be used at lower temperatures. Therefore, the range of application temperatures is relatively wide. Additionally, it is relatively cost effective to use the well service composition as compared to other existing products. The desirable rheological characteristics of the gels obtained in the embodiments of the present invention can facilitate oil and natural gas production. Other characteristics and advantages provided by embodiments of the invention are apparent to those skilled in the art.

While the invention has been described with respect to a limited number of embodiments, these embodiments are not intended to limit the scope of the invention as otherwise described and claimed herein. Variations and modifications from the described embodiments exist. For example, although a presently preferred copolymer is a monoester copolymer of styrene and maleic anhydride, other forms of SMA copolymers can also be used, especially those which are derived from a styrene and maleic anhydride copolymer.

A combination of two or more polymers or copolymers can be used. For example, a monoester copolymer of styrene and maleic anhydride can be combined with a polysaccharide. When desired, some components can be substituted by a more environmentally friendly equivalent to formulate a "green" composition. Additives can be used to adjust the properties of the composition to meet certain requirements. While embodiments of the invention are described with respect to hydrocarbon gels, the invention is not so limited. It is possible to substitute an organic base fluid by an aqueous fluid to formulate an aqueous well service composition. In that case, the monoester copolymer of SMA and the alkyl orthophosphate ester should preferably be water-soluble or water-dispersible. Such copolymer properties can be obtained by adjusting the styrene to maleic anhydride ratio to less than 1, such as 0.5, 0.25, and 0.01. Water solubility or dispersability can also be obtained by introducing hydrophilic groups onto the copolymer. In describing the method of making and using the well service composition, various steps are disclosed. These steps can be practiced in any order or sequence unless otherwise specified. Moreover, one or more steps can be combined into one single step. Conversely, one step can be practiced in two or more sub-steps. Whenever a number is disclosed herein, it should be interpreted to mean "about" or "approximate", regardless of whether these terms are used in describing the number. The appended claims intend to cover all such variations and modifications as falling within the scope of the invention.

What is claimed is:

1. A method of treating a subterranean formation, the method comprising:
   providing a mixture comprising an organic base fluid, a monoester copolymer of styrene and maleic anhydride, and an alkyl orthophosphate ester; and
   injecting the mixture into at least a portion of the subterranean formation.

2. The method of claim 1, wherein the monoester copolymer is at least partially soluble or dispersible in the organic base fluid.

3. The method of claim 1, further comprising adding a crosslinking agent to the mixture to form a gel, wherein the crosslinking agent is capable of increasing the viscosity of the mixture.

4. The method of claim 3, wherein the crosslinking agent is added before the mixture is injected into the subterranean formation.

5. The method of claim 3, wherein the crosslinking agent is added after the mixture is injected into the subterranean formation.

6. The method of claim 3, wherein the crosslinking agent is added concurrently as the mixture is injected into the subterranean formation.

7. The method of claim 3, wherein a breaking agent is added to the gel to decrease its viscosity.

* * * * *